(12) United States Patent
Feng et al.

(10) Patent No.: US 9,016,429 B2
(45) Date of Patent: Apr. 28, 2015

(54) MACHINE BEARING SYSTEM INCLUDING HARD THIN FILM AND METHOD OF USING SAME

(71) Applicant: Caterpillar, Inc., Peoria, IL (US)

(72) Inventors: Bao Feng, Dunlap, IL (US); M. Brad Beardsley, Laura, IL (US)

(73) Assignee: Caterpillar Inc., Peoria, IL (US)

( * ) Notice: Subject to any disclaimer, the term of this patent is extended or adjusted under 35 U.S.C. 154(b) by 101 days.

(21) Appl. No.: 13/855,370

(22) Filed: Apr. 2, 2013

(65) Prior Publication Data

US 2014/0291060 A1    Oct. 2, 2014

(51) Int. Cl.
  *F16H 57/021*  (2012.01)
  *F16C 32/06*  (2006.01)

(52) U.S. Cl.
  CPC .......... *F16H 57/021* (2013.01); *F16C 32/0629* (2013.01)

(58) Field of Classification Search
  USPC .............. 180/339; 384/276.2, 296, 625, 907, 384/907.1, 912, 913, 276; 475/331
  See application file for complete search history.

(56) References Cited

U.S. PATENT DOCUMENTS

| | | | | |
|---|---|---|---|---|
| 4,366,994 A * | 1/1983 | Yoshioka | ......................... | 384/99 |
| 4,518,205 A * | 5/1985 | Heathe | ............................ | 384/29 |
| 5,443,426 A * | 8/1995 | Frost | ............................... | 475/91 |
| 5,503,481 A * | 4/1996 | Hashimoto et al. | ........... | 384/569 |
| 5,593,234 A * | 1/1997 | Liston | ............................ | 384/492 |
| 5,700,546 A * | 12/1997 | Fujii et al. | ..................... | 428/156 |
| 5,885,182 A * | 3/1999 | Forsyth | ......................... | 475/198 |
| 5,890,986 A * | 4/1999 | Pritchard et al. | .............. | 475/206 |
| 6,264,209 B1 * | 7/2001 | Miya et al. | .................... | 279/46.2 |
| 6,655,845 B1 * | 12/2003 | Pope et al. | .................... | 384/492 |
| 6,740,428 B2 * | 5/2004 | Norito et al. | .................. | 428/673 |
| 7,255,083 B2 | 8/2007 | Hamada et al. | | |
| 7,300,379 B2 | 11/2007 | Doll et al. | | |
| 7,682,083 B2 | 3/2010 | Hong et al. | | |
| 8,119,240 B2 | 2/2012 | Cooper | | |
| 8,496,382 B2 * | 7/2013 | Evans et al. | ................... | 384/571 |
| 2010/0120576 A1 | 5/2010 | Satou et al. | | |
| 2010/0234254 A1 | 9/2010 | Koshima et al. | | |

FOREIGN PATENT DOCUMENTS

| | | |
|---|---|---|
| DE | 20023443 | 5/2004 |
| EP | 2159454 | 3/2010 |
| JP | 2006266429 | 10/2006 |
| JP | 2007186733 | 7/2007 |

* cited by examiner

*Primary Examiner* — Drew Brown
(74) *Attorney, Agent, or Firm* — BakerHostetler

(57) ABSTRACT

A bearing system includes a sleeve bearing supported on a shaft and a gear supported on the sleeve bearing. The shaft has an outer diameter shaft surface, the sleeve bearing has an inner diameter bearing surface and an outer diameter bearing surface, and the gear has a gear bore surface. At least one of the outer diameter shaft surface, the inner diameter bearing surface, the outer diameter bearing surface, and the gear bore surface includes an isotropic surface finish and a hard thin film over the isotropic surface finish. During a break-in period of operation of the bearing system, the hard thin film over the isotropic surface finish breaks in a counter surface of the bearing system to extend a hydrodynamic lubrication period of operation of the bearing system.

20 Claims, 3 Drawing Sheets

MACHINE BEARING SYSTEM INCLUDING HARD THIN FILM AND METHOD OF USING SAME

TECHNICAL FIELD

The present disclosure relates generally to a machine bearing system that includes a sleeve bearing, and more particularly to a hard thin film deposited over an isotropic surface finish of at least one of the sliding contact surfaces of the bearing system.

BACKGROUND

A conventional drivetrain, or powertrain, for machines, particularly for heavy industrial machinery such as machinery used in forestry, landfill operations, agriculture, mining, construction, material handling, tunneling, drilling and other industries, often includes a power source that is operatively connected to ground engaging elements, such as rear wheels of the machine. In particular, for example, the power source may be operatively connected through a transmission to a rear differential that is configured to transmit rotational power to rear wheels disposed on opposing sides of the machine. Two axle shafts extending from the differential may be connected to the rear wheels through drive assemblies, which might each include a final drive. The final drive may be configured to provide a reduction in rotational velocity, and an increase in torque, delivered to the rear wheels.

Final drives have a variety of different configurations, depending on the particular application, and typically include sun gears, planet gears, carriers, and ring gears. Such planetary gear sets are known and, typically, each of the planet gears in the set is rotatably supported on a pin or shaft, which is supported on a respective carrier, using roller or needle bearings. Although capable of reducing friction between rotating components and suitable for some applications, roller-type bearings are known to have low load bearing capacity. In addition, roller-type bearings have numerous parts, which are potential sources of wear and failure.

European Patent Application 2159454 (hereinafter EP '454) discusses problems with using any type of bearing in an interface between an engine's idler gear and idler gear hub. In fact, lubrication and failure issues with respect to bearings are discussed with respect to various applications. The EP '454 reference goes on to teach a replacement of a bearing between the idler gear and idler gear hub with a low friction coating layer, such as a DLC or polymer coating layer, on at least one of the idler gear and the idler gear hub. It should be appreciated that mechanical systems having rotating components, which may include bearings, are used in a variety of different applications. Each of these different applications may have unique requirements, including load capacity requirements, which must be addressed within certain application constraints. As such, there is a continuing need for improvements with respect to rotating components in mechanical systems.

The present disclosure is directed to one or more of the problems or issues set forth above.

SUMMARY OF THE DISCLOSURE

In one aspect, a machine includes a power source, a plurality of ground engaging elements, and a drivetrain coupling the power source and the ground engaging elements. The drivetrain includes a bearing system, which includes a sleeve bearing supported on a shaft and a gear supported on the sleeve bearing. The shaft has an outer diameter shaft surface, the sleeve bearing has an inner diameter bearing surface and an outer diameter bearing surface, and the gear has a gear bore surface. At least one of the outer diameter shaft surface, the inner diameter bearing surface, the outer diameter bearing surface, and the gear bore surface includes an isotropic surface finish and a hard thin film over the isotropic surface finish. During a break-in period of operation of the bearing system, the hard thin film over the isotropic surface finish breaks in a counter surface of the bearing system to extend a hydrodynamic lubrication period of operation of the bearing system.

In another aspect, a method of using a bearing system for a machine is provided. The machine includes a power source, a plurality of ground engaging elements, and a drivetrain coupling the power source and the ground engaging elements. The drivetrain includes the bearing system, which includes a sleeve bearing supported on a shaft and a gear supported on the sleeve bearing. The shaft has an outer diameter shaft surface, the sleeve bearing has an inner diameter bearing surface and an outer diameter bearing surface, and the gear has a gear bore surface. At least one of the outer diameter shaft surface, the inner diameter bearing surface, the outer diameter bearing surface, and the gear bore surface includes an isotropic surface finish and a hard thin film over the isotropic surface finish. The method includes a step of making sliding contact between at least two of the outer diameter shaft surface, the inner diameter bearing surface, the outer diameter bearing surface, and the gear bore surface during a break-in period of operation of the bearing system. During the break-in period of operation, a counter surface of the bearing system is broken in using the hard thin film over the isotropic surface finish. In response to the breaking in step, a hydrodynamic lubrication period of operation of the bearing system is extended.

In another aspect, a bearing system for a machine includes a shaft having an outer diameter shaft surface. A sleeve bearing is supported on the shaft and has an inner diameter bearing surface and an outer diameter bearing surface. A rotating component is supported on the sleeve bearing and has a component bore surface. At least one of the outer diameter shaft surface, the inner diameter bearing surface, the outer diameter bearing surface, and the component bore surface includes an isotropic surface finish and a hard thin film over the isotropic surface finish. During a break-in period of operation of the bearing system, the hard thin film over the isotropic surface finish breaks in a counter surface of the bearing system to extend a hydrodynamic lubrication period of operation of the bearing system.

DETAILED DESCRIPTION

Figure 1:
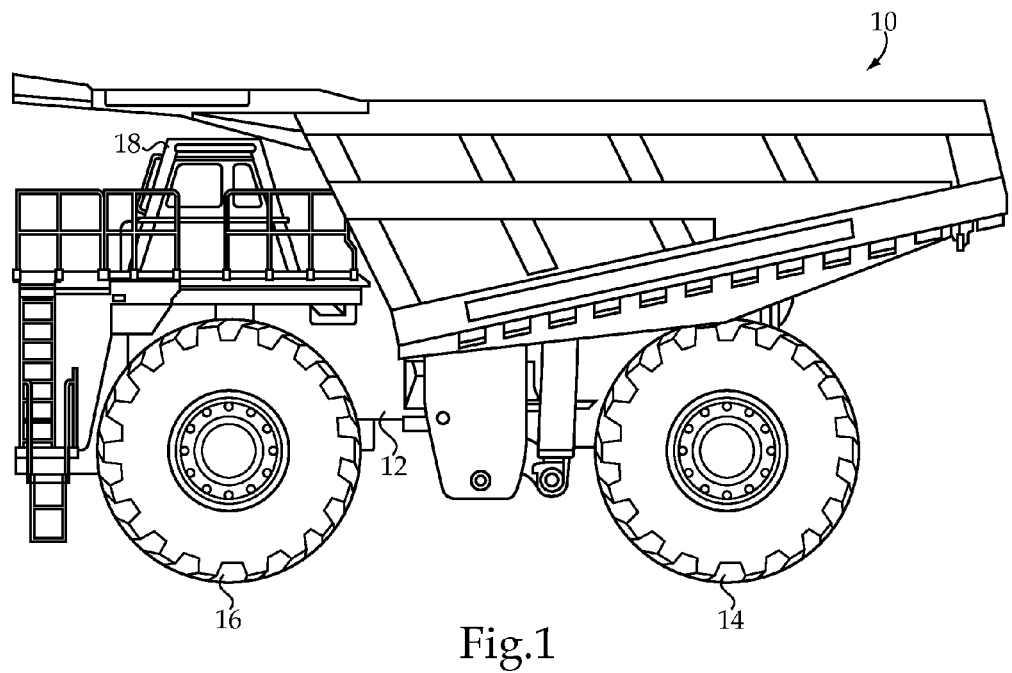
FIG. 1 is a perspective view of an exemplary embodiment of a machine, according to the present disclosure.

An exemplary embodiment of a machine 10 is shown generally in FIG. 1. The machine 10 may be an off-highway truck, as shown, or any other on or off-highway machine that includes a propulsion system for the machine 10. Other exemplary machines may include, for example, wheel loaders, motor graders, wheeled or tracked dozers, wheeled or tracked excavators, water trucks, articulated trucks and similar heavy mobile equipment. Alternatively, the present disclosure may be applicable to stationary machines, such as power generation systems, which may include wind turbines and the like. The exemplary machine 10 generally includes a frame 12 that supports a power source (not shown) operatively coupled for propulsion to rear wheels 14. Front wheels 16 may or may not be driven and may be operable for front-wheel steering. The frame 12 also supports an operator station 18 that includes various systems and components for controlling operation of the machine 10.

Figure 2:
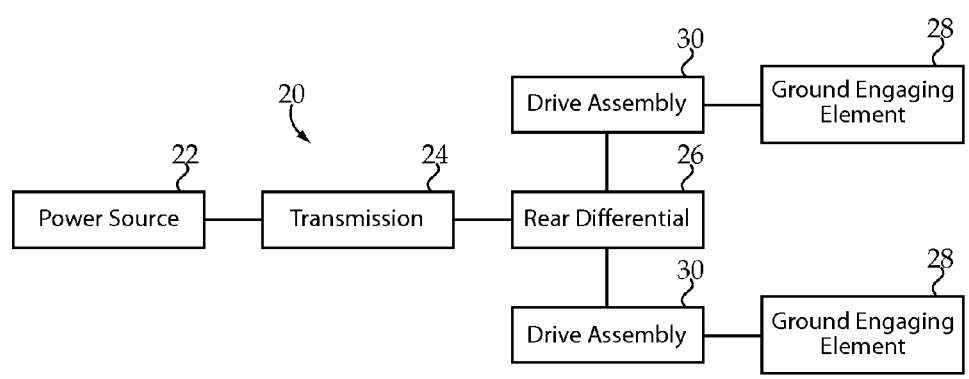
FIG. 2 is a simplified block diagram of a drivetrain of the machine of FIG. 1.

An exemplary drivetrain 20 for propelling the machine 10 is shown generally in FIG. 2. The drivetrain 20 is powered by a power source 22, which may include an engine, such as, for example, a diesel engine, a gasoline engine, a gaseous fuel powered engine, or any other type of engine apparent to one skilled in the art. The power source 22 may alternatively include a non-combustion source of power such as a fuel cell, power storage device, electric motor, or similar mechanism. The power source 22 may be operatively connected through a transmission 24 to a rear differential 26 that is configured to transmit rotational power to ground engaging elements 28, which may include the rear wheels 14 of machine 10 shown in FIG. 1. According to a particular arrangement, two axle shafts (not shown) extending from the differential 26 may be connected to the ground engaging elements 28 through drive assemblies 30.

Figure 3:
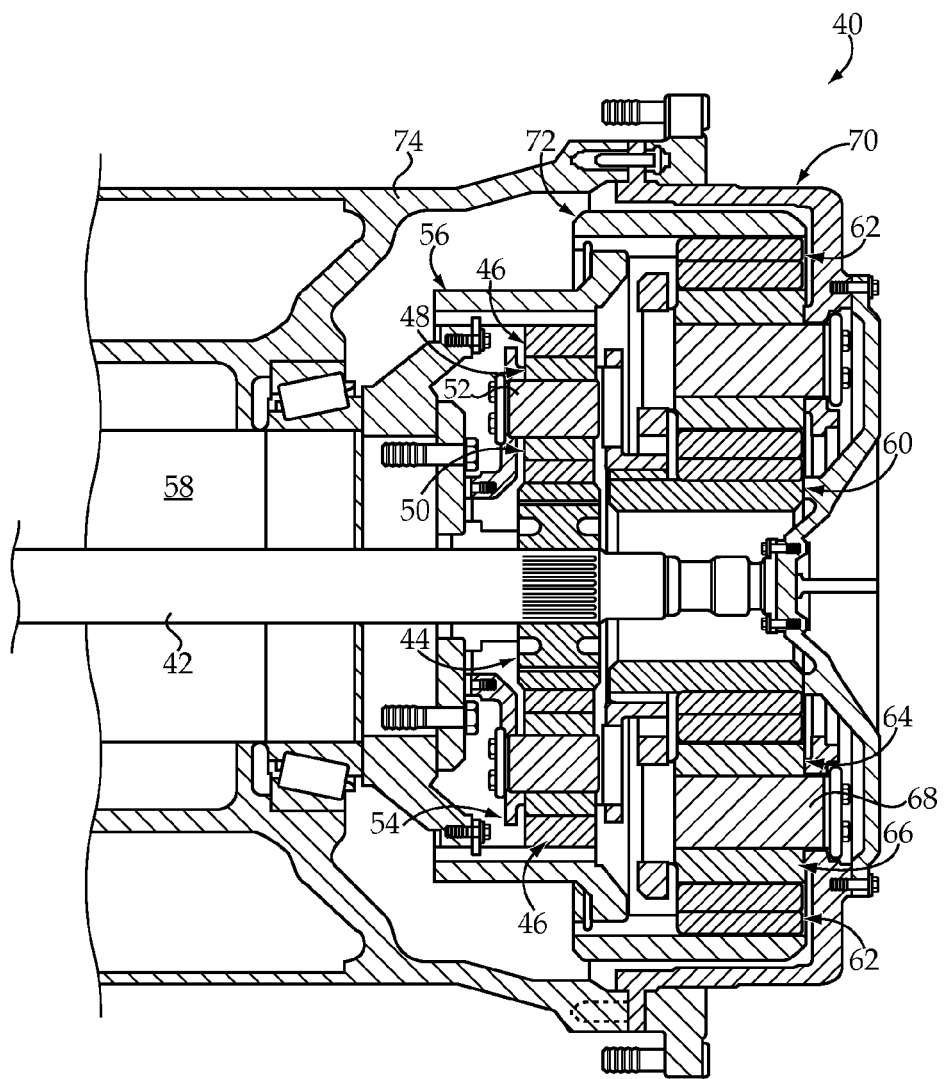
FIG. 3 is a cross sectional view through a drive assembly of the machine of FIG. 1, depicting an exemplary final drive.

Each of the drive assemblies 30 may include a final drive, an exemplary embodiment of which is shown at 40 in FIG. 3. As shown, the final drive 40 may be disposed at an end of an axle shaft 42 and may include a double reduction planetary gear set. In particular, the final drive 40 may include a first reduction sun gear 44 coupled to rotate with the axle shaft 42 and positioned to drivingly engage a plurality of radially disposed planet gears 46. The planet gears 46 may each include a central bore 48 and sleeve bearing 50 for receiving a shaft 52 fixedly connected to a first reduction carrier 54 for rotation of the carrier 54. In particular, the carrier 54 may be rotated as the planet gears 46 are rotatably moved along a first reduction ring gear 56, which may be restricted from movement by, and connected to, a spindle 58.

The first reduction carrier 54 may be rotatably coupled to a second reduction sun gear 60. The second reduction sun gear 60 may engage a plurality of second reduction planet gears 62, which each include a central bore 64 and sleeve bearing 66 for receiving a shaft 68 fixedly connected to a second reduction carrier 70 for rotation of the carrier 70. That is, the carrier 70 may be rotated as the planet gears 62 are rotatably moved along a second reduction ring gear 72. The carrier 70 may be attached to rotate a wheel assembly 74, which may ultimately rotate ground engaging elements 28 of FIG. 2. Of course, other final drive arrangements are well known in the art.

Figure 4:
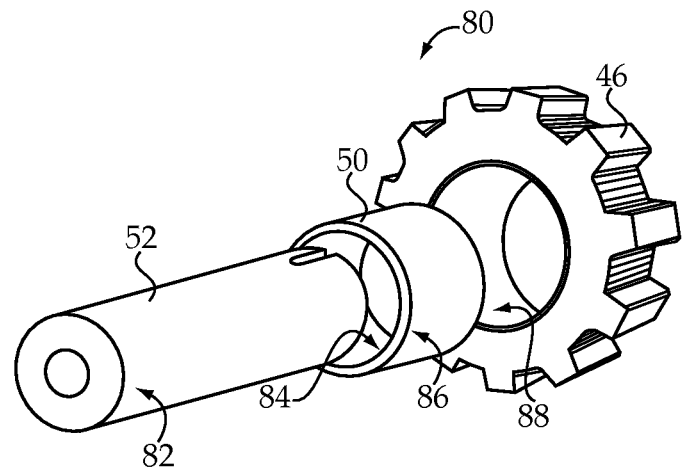
FIG. 4 is an exploded perspective view of a bearing system of the final drive of FIG. 3.

A bearing system 80, according to the present disclosure, will be discussed in FIG. 4 with reference to the first reduction planet gear 46, sleeve bearing 50, and shaft 52 of FIG. 3. However, it should be appreciated that alternative bearing systems, within and/or apart from the drivetrain 20, which may also benefit from the concepts of the present disclosure, are contemplated. Returning to FIG. 4, the bearing system 80 includes the sleeve bearing 50, which is supported on the shaft 52 in an operational configuration of the bearing system 80, and the gear 46, or other rotating component, which is supported on the sleeve bearing 50 in the operational configuration. As shown, the shaft 52 has an outer diameter shaft surface 82, the sleeve bearing 50 has an inner diameter bearing surface 84 and an outer diameter bearing surface 86, and the gear 46 has a gear bore surface 88, which may also be referred to as a component bore surface.

The outer diameter shaft surface 82 and the inner diameter bearing surface 84 may define an inner pair of sliding surfaces, and the outer diameter bearing surface 86 and the gear bore surface 88 may define an outer pair of sliding surfaces. Typically, relative motion between the gear 46 and the shaft 52 may be transmitted through surface sliding at either of the inner and outer pairs of sliding surfaces. However, according to some embodiments, the sleeve bearing 50 may have an interference fit with respect to one of the gear 46 and the shaft 52. As such, the relative motion between the gear 46 and the shaft 52 may be transmitted through surface sliding at only one of the inner and outer pairs of sliding surfaces. During operation of the bearing system 80, lubricant is filled in the spaces formed between the surfaces of the inner and outer pairs of sliding surfaces to reduce friction therebetween.

Figure 5:
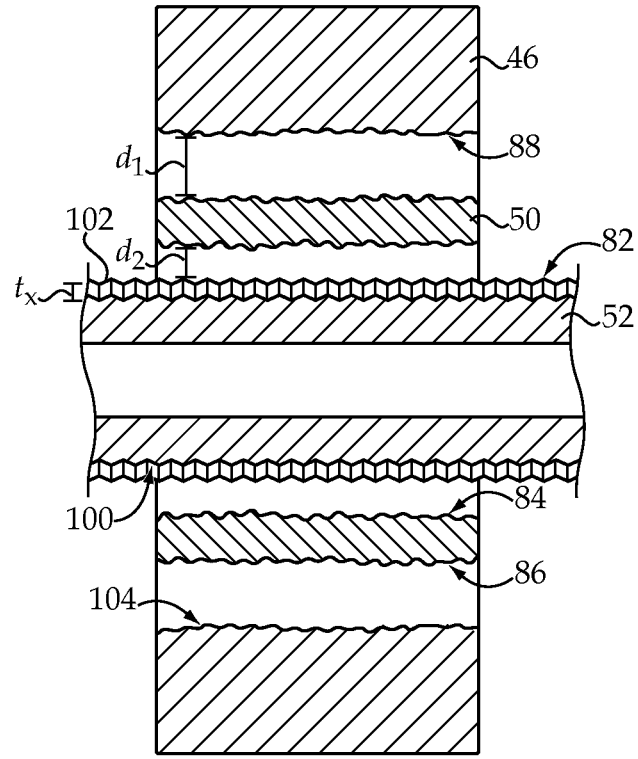
FIG. 5 is an enlarged and exaggerated cross sectional view of the bearing system of FIG. 4, depicting a hard thin film deposited over an isotropic surface finish, according to one aspect of the present disclosure.

As disclosed herein, at least one of the outer diameter shaft surface 82, the inner diameter bearing surface 84, the outer diameter bearing surface 86, and the gear bore surface 88 includes an isotropic surface finish and a hard thin film over the isotropic surface finish. For example, as shown in FIG. 5, the outer diameter shaft surface 82 may include an isotropic surface finish 100 and a hard thin film 102 over the isotropic surface finish 100. The hard thin film 102 is preferably applied on the harder surface in the pair of sliding surfaces. As will be discussed below, the shaft 52 and the gear 46 may each be made from a relatively hard metal, such as steel, while the sleeve bearing 50 may be made from a softer metal material.

According to the exemplary embodiment, the outer diameter shaft surface 82 may have an arithmetic average surface roughness Ra (hereinafter Ra) of less than about 0.1 micron. It should be appreciated that the outer diameter shaft surface 82 may be finished to the desired Ra using any of a number of known machining, or surface finishing, processes. The outer diameter shaft surface 82 may also include the isotropic surface finish 100, such that peaks occurring as a result of the machining or finishing processes used to achieve the desired Ra are removed. The isotropic surface finish 100, described herein, refers to a particular surface finish in which peaks of the surface asperities have been removed, and does not insinuate a specific process for providing the isotropic surface finish 100. Such processes may include any known chemical and/or mechanical processes, including vibratory finishing processes, to achieve the known isotropic surface finish 100.

The hard thin film 102 preferably has a nanohardness of at least about 11 gigapascals. According to some examples, the hard thin film 102 may include a diamond-like carbon film or, more specifically, an amorphous diamond-like carbon film, which provides low friction and high wear resistance. Pure diamond-like carbon, or ta-C, may be used, or, diamond-like carbon doped with elements, such as silicon, may be used. Alternative materials, which may be applied as a coating or film and may exhibit similar properties, may be used. For example, coatings including transition metals may also be used. Preferably, the hard thin film 102 has an elasticity sufficient to withstand a load range of applications experiencing contact pressure of up to 1 gigapascal.

The hard thin film 102, which may also be referred to as a coating, may be applied or deposited on the outer diameter shaft surface 82, which includes the isotropic surface finish 100, using any of a number of different processes. According to one exemplary embodiment, the hard thin film 102 may be applied using chemical vapor deposition or cathodic arc deposition. According to a specific example, a known plasma assisted chemical vapor deposition process may be used to provide the hard thin film 102. The hard thin film 102 may be deposited to a radial thickness tx of between about 0.5 micron and about 20 microns. Since the thickness tx of the hard thin film 102 is negligible, there is no need to change existing clearance design. As a result, existing bearing systems may be retrofitted to include bearing system components that include the disclosed features.

The isotropic surface finish 100 may provide better support for the hard thin film 102 than a surface not having the isotropic surface finish 100. For example, if the hard thin film 102 is deposited on a surface having sharp peaks left by machining processes, such as grinding, the stress on the peaks may be high and may induce cracking of the hard thin film 102. Ultimately, cracking of the hard thin film 102 may lead to the separation and/or breaking off of portions of the hard thin film 102 relative to the outer diameter shaft surface 82. Since the isotropic surface finish 100 has the sharp peaks removed, a better support base for the hard thin film 102 may be provided.

In addition, the isotropic surface finish 100 in combination with the hard thin film 102 will break in the inner diameter bearing surface 84. In particular, since the hard thin film 102 on the outer diameter shaft surface 82 is much harder than the inner diameter bearing surface 84, the hard thin film 102 will function to break in the inner diameter bearing surface 84. If the isotropic surface finish 100 were not provided, however, the hard thin film 102 would include sharp surface peaks and may grind and wear the inner diameter bearing surface 84. However, since the outer diameter shaft surface 82 includes the isotropic surface finish 100, the hard thin film 102 is less abrasive than if the outer diameter shaft surface 82 did not include the isotropic surface finish 100. As a result, an efficient and effective reduction of the Ra of the inner diameter bearing surface 84 may be provided.

The sleeve bearing 50, the structure of which is known to those skilled in the art, includes a solid cylindrical sleeve body made from any known bearing material. According to the exemplary embodiment, the sleeve bearing 50 may be made from a copper based alloy and, according to a specific example, may be made from aluminum bronze. The sleeve bearing 50 may have an initial Ra (e.g., an Ra before operation within the bearing system 80) of up to 1 micron. According to some embodiments, the sleeve bearing 50 may have an initial Ra of between about 0.3 micron and about 0.8 micron. According to the exemplary embodiment, the inner diameter bearing surface 84 may define a counter surface of the outer diameter shaft surface 82 and, as such, the initial Ra of the inner diameter bearing surface 84 may be broken in or smoothed by the hard thin film 102 over the isotropic surface finish 100, as will be described below.

Various combinations of materials, coatings and/or surface finishes may be incorporated into the bearing system 80. For example, additional surfaces may include an isotropic surface finish, similar to the isotropic surface finish 100. As shown, the gear bore surface 88 may also include an isotropic surface finish 104. Alternatively or additionally, the gear bore surface 88 may be coated with the material of the sleeve bearing 50. The gear bore surface 88, or another surface, may be coated with a hard thin film, which may be similar to the hard thin film 102. According to some embodiments, and as shown in FIG. 5, an initial outer diameter clearance $d_1$ between the gear bore surface 88 and the outer diameter bearing surface 86 may be greater than an initial inner diameter clearance $d_2$ between the inner diameter bearing surface 84 and the outer diameter shaft surface 82 for reasons that will be discussed below.

INDUSTRIAL APPLICABILITY

The present disclosure may be applicable to bearing systems for machines. In particular, the present disclosure is applicable to bearing systems including sleeve bearings. Further the present disclosure is applicable to coatings and/or surface finishes for reducing frictional welding, or scuffing, of the rotating components of the bearing system. An exemplary bearing system may be found in a final drive of a drive assembly for a machine, as described above.

Referring generally to FIGS. 1-5, an exemplary machine 10 may include a drivetrain 20 supported on a frame 12 of the machine 10. The drivetrain 20 may be powered by a power source 22, which provides power through a transmission 24 to a rear differential 26. Two axle shafts may extend from the differential and transmit rotational power through drive assemblies 30 to ground engaging elements 28, such as rear wheels 14 of the machine 10. The drive assemblies 30 may each include a final drive 40 for providing a reduction in rotational velocity, and an increase in torque, delivered to the rear wheels 14. Each final drive 40 may include, in addition to other planetary gear set components, a first reduction planet gear 46, a sleeve bearing 50, and a shaft 52.

A bearing system 80 of the present disclosure will be described with reference to the shaft 52, the sleeve bearing 50 supported on the shaft 52, and the planet gear 46 supported on the sleeve bearing 50. The shaft 52 has an outer diameter shaft surface 82, the sleeve bearing 50 has an inner diameter bearing surface 84 and an outer diameter bearing surface 86, and the gear 46 has a gear bore surface 88. The outer diameter shaft surface 82 and the inner diameter bearing surface 84 may define an inner pair of sliding surfaces, and the outer diameter bearing surface 86 and the gear bore surface 88 may define an outer pair of sliding surfaces.

Typically, relative motion between the gear 46 and the shaft 52 may be transmitted through surface sliding at either of the inner and outer pairs of sliding surfaces. In particular, at least two of the outer diameter shaft surface 82, the inner diameter bearing surface 84, the outer diameter bearing surface 86, and the gear bore surface 88 make sliding contact during operation of the bearing system 80. As is known by those skilled in the art, lubricant is filled in the spaces formed between the surfaces of the inner and outer pairs of sliding surfaces for reducing friction therebetween. During start up and stopping, relatively slow speeds, high contact pressures, and with less than perfectly smooth surfaces, a boundary lubrication period of operation may exist, during which the lubricant is insufficient to prevent surface contact. A hydrodynamic lubrication period of operation, on the other hand, may exist when the lubricant separates the surfaces such that no contact exists.

As disclosed herein, at least one of the outer diameter shaft surface 82, the inner diameter bearing surface 84, the outer diameter bearing surface 86, and the gear bore surface 88 includes an isotropic surface finish and a hard thin film over the isotropic surface finish 100. In particular, as shown in FIG. 5, the outer diameter shaft surface 82 may include an isotropic surface finish 100 and a hard thin film 102 over the isotropic surface finish 100, which provides low friction and high wear resistance. During operation of the bearing system 80, and when friction emerges, sliding might be transferred to the one of the inner and outer pairs of sliding surfaces having the lower friction coefficient. In particular, sliding might be transferred to the inner pair of sliding surfaces, which, according to the exemplary embodiment, includes the hard thin film 102. As such, temperature may be maintained low and stable and scuffing may be reduced. In particular, the hard thin film 102 may provide a hard, low friction, non-metal film between the sliding metal surfaces.

During a break-in period of operation of the bearing system 80, which may occur during a boundary lubrication period of operation and during an initial use of the bearing system 80, a counter surface of the outer diameter shaft surface 82 (i.e., the inner diameter bearing surface 84) may be broken in using the isotropic surface finish 100 and the hard thin film 102 of the outer diameter shaft surface 82. As described above, since the hard thin film 102 on the outer diameter shaft surface 82 is much harder than the inner diameter bearing surface 84, the hard thin film 102 will serve to break in the inner diameter bearing surface 84. In addition, since the outer diameter shaft surface 82 includes the isotropic surface finish 100, the hard thin film 102 is less abrasive than if the outer diameter shaft surface 82 did not include the isotropic surface finish 100. As such, smoothing, rather than grinding, may occur.

According to some embodiments, the inner diameter bearing surface 84 may be smoothed from an initial Ra of between about 0.3 micron and about 0.8 micron. According to a specific example, an Ra of the inner diameter bearing surface 84 may be reduced to less than about 0.1 micron, or another Ra that substantially matches the Ra of the outer diameter shaft surface 82. By reducing the Ra of the inner diameter bearing surface 84, the hydrodynamic lubrication period of operation of the bearing system 80 may be extended. It should be appreciated that the different lubrication regimes may be defined by a lambda ratio of lubricating film thickness to surface roughness. As the combined surface roughness of the inner diameter bearing surface 84 and the outer diameter shaft surface 82 is reduced, the hydrodynamic lubrication period of operation may be extended. In addition to smoothing the counter surface, the hard thin film 102 over the isotropic surface finish 100 may function to conform the counter surface such that improved sliding contact exists.

Since the sleeve bearing 50 is normally made of materials, such as copper alloys, with larger thermal expansion coefficients than those of the planet gear and shaft materials, a diameter of the sleeve bearing 50 will increase faster than the shaft 52 and the gear 46 in response to increased heat. As a result, the clearance $d_1$ between the gear bore surface 88 and the outer diameter bearing surface 86 will decrease, while the clearance $d_2$ between the inner diameter bearing surface 84 and the outer diameter shaft surface 82 increases. Thus, during operation, the sliding motion will inevitably become easier between the inner pair of contact surfaces under the effect of frictional heating in the boundary lubrication period of operation. As such, once the load increases and/or the sliding speed decreases sufficient to reach the boundary lubrication period of operation, in which surface asperities on the gear bore surface 88 and the outer diameter bearing surface 86 start to make substantial contact and produce elevated contact temperatures, the sliding motion may transfer from the outer pair of contact surfaces to the inner pair of contact surfaces. During the boundary lubrication period of operation, the inner pair of contact surfaces may be protected by the hard thin film 102, in the manner described herein.

To further effect this transition from the outer pair of contact surfaces to the inner pair of contact surfaces, an initial outer diameter clearance $d_1$ between the gear bore surface 88 and the outer diameter bearing surface 86 may be greater than an initial inner diameter clearance $d_2$ between the inner diameter bearing surface 84 and the outer diameter shaft surface 82. During operation, as described herein, these clearances $d_1$ and $d_2$ change.

The bearing system 80 disclosed herein offers improvements to reduce scuffing, which might otherwise lead to significant material loss, frictional heating, lubricant degradation, and seizure. In particular, the hard thin film 102 may reduce friction and heating, reduce metal-to-metal welding, and reduce surface damage caused by contact vibration and component realignment. The isotropic surface finish 100 provides good support for the hard thin film 102 and may be used to break in, or smooth, a counter surface, which may ultimately extend the hydrodynamic lubrication period of operation of the bearing system 80. As such, component life and lubricant life may be extended, and efficiency of the bearing system 80 may be improved.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A machine, comprising:
   a power source;
   a plurality of ground engaging elements; and
   a drivetrain coupling the power source and the ground engaging elements and including a bearing system, wherein the bearing system includes a sleeve bearing supported on a shaft and a gear supported on the sleeve bearing;
   wherein the shaft has an outer diameter shaft surface, the sleeve bearing has an inner diameter bearing surface and an outer diameter bearing surface, and the gear has a gear bore surface;
   wherein at least one of the outer diameter shaft surface, the inner diameter bearing surface, the outer diameter bearing surface, or the gear bore surface includes an isotropic surface finish and a hard thin film over the isotropic surface finish;
   wherein, during a break-in period of operation of the bearing system, the hard thin film over the isotropic surface finish breaks in a counter surface of the bearing system to extend a hydrodynamic lubrication period of operation of the bearing system.

2. The machine of claim 1, wherein the outer diameter shaft surface includes the isotropic surface finish and the hard thin film over the isotropic surface finish, and the counter surface includes the inner diameter bearing surface.

3. The machine of claim 2, wherein a radial thickness of the hard thin film is between about 0.5 micron and about 20 microns.

4. The machine of claim 3, wherein the hard thin film is a diamond-like carbon film.

5. The machine of claim 4, wherein the hard thin film is an amorphous diamond-like carbon film.

6. The machine of claim 3, wherein the hard thin film has a nanohardness of at least about 11 gigapascals.

7. The machine of claim 6, wherein the outer diameter shaft surface has an arithmetic average surface roughness Ra of less than about 0.1 micron.

8. The machine of claim 7, wherein the sleeve bearing is made from a copper based alloy.

9. The machine of claim 7, wherein the gear bore surface also includes the isotropic surface finish.

10. The machine of claim 7, wherein an initial outer diameter clearance between the gear bore surface and the outer diameter bearing surface is greater than an initial inner diameter clearance between the inner diameter bearing surface and the outer diameter shaft surface.

11. A method of using a bearing system for a machine, the machine including a power source, a plurality of ground engaging elements, and a drivetrain coupling the power source and the ground engaging elements and including the bearing system, wherein the bearing system includes a sleeve bearing supported on a shaft and a gear supported on the sleeve bearing, wherein the shaft has an outer diameter shaft surface, the sleeve bearing has an inner diameter bearing surface and an outer diameter bearing surface, and the gear has a gear bore surface, wherein at least one of the outer diameter shaft surface, the inner diameter bearing surface, the outer diameter bearing surface, or the gear bore surface includes an isotropic surface finish and a hard thin film over the isotropic surface finish, the method comprising:

making sliding contact between at least two of the outer diameter shaft surface, the inner diameter bearing surface, the outer diameter bearing surface, and the gear bore surface during a break-in period of operation of the bearing system;

breaking in a counter surface of the bearing system using the hard thin film over the isotropic surface finish during the break-in period of operation; and extending a hydrodynamic lubrication period of operation of the bearing system responsive to the breaking in step.

12. The method of claim 11, wherein the breaking in step includes breaking in the inner diameter bearing surface using the outer diameter shaft surface, wherein the outer diameter shaft surface includes the isotropic surface finish and the hard thin film over the isotropic surface finish.

13. The method of claim 12, wherein the breaking in step includes breaking in a copper based alloy material of the inner diameter bearing surface.

14. The method of claim 13, wherein the breaking in step includes breaking in the inner diameter bearing surface from an initial arithmetic average surface roughness Ra of up to 1 micron.

15. The method of claim 14, wherein the breaking in step further includes reducing an arithmetic average surface roughness Ra of the inner diameter bearing surface to less than about 0.1 micron, wherein an arithmetic average surface roughness Ra of the outer diameter shaft surface is less than about 0.1 micron.

16. A bearing system for a machine, comprising:

a shaft having an outer diameter shaft surface;

a sleeve bearing supported on the shaft and having an inner diameter bearing surface and an outer diameter bearing surface; and a rotating component supported on the sleeve bearing and having a component bore surface;

wherein at least one of the outer diameter shaft surface, the inner diameter bearing surface, the outer diameter bearing surface, or the component bore surface includes an isotropic surface finish and a hard thin film over the isotropic surface finish;

wherein, during a break-in period of operation of the bearing system, the hard thin film over the isotropic surface finish breaks in a counter surface of the bearing system to extend a hydrodynamic lubrication period of operation of the bearing system.

17. The bearing system of claim 16, wherein the outer diameter shaft surface includes the isotropic surface finish and the hard thin film over the isotropic surface finish, and the counter surface includes the inner diameter bearing surface.

18. The bearing system of claim 17, wherein the outer diameter shaft surface has an arithmetic average surface roughness Ra of less than about 0.1 micron.

19. The bearing system of claim 18, wherein the hard thin film has a nanohardness of at least about 11 gigapascals.

20. The bearing system of claim 19, wherein a radial thickness of the hard thin film is between about 0.5 micron and about 20 microns.

* * * * *

UNITED STATES PATENT AND TRADEMARK OFFICE
CERTIFICATE OF CORRECTION

| | | |
|---|---|---|
| PATENT NO. | : 9,016,429 B2 | Page 1 of 1 |
| APPLICATION NO. | : 13/855370 | |
| DATED | : April 28, 2015 | |
| INVENTOR(S) | : Feng et al. | |

It is certified that error appears in the above-identified patent and that said Letters Patent is hereby corrected as shown below:

Title Page, Column 1, Item 71 (Applicant), line 1, delete "Caterpillar, Inc.," and insert
-- Caterpillar Inc., --.

Signed and Sealed this
Nineteenth Day of April, 2016

Michelle K. Lee
*Director of the United States Patent and Trademark Office*